United States Patent
Goodman

(10) Patent No.: US 9,838,520 B2
(45) Date of Patent: Dec. 5, 2017

(54) MAGNETIC STRIPE ATTACHMENT AND APPLICATION FOR MOBILE ELECTRONIC DEVICES

(75) Inventor: Daniel J. Goodman, White Plains, NY (US)

(73) Assignee: MASTERCARD INTERNATIONAL INCORPORATED PURCHASE, New York, NY (US)

(*) Notice: Subject to any disclaimer, the term of this patent is extended or adjusted under 35 U.S.C. 154(b) by 1143 days.

(21) Appl. No.: 13/092,632

(22) Filed: Apr. 22, 2011

(65) Prior Publication Data
US 2012/0270528 A1    Oct. 25, 2012

(51) Int. Cl.
| | |
|---|---|
| H04W 88/02 | (2009.01) |
| H04M 1/21 | (2006.01) |
| H04M 17/00 | (2006.01) |
| H04M 17/02 | (2006.01) |
| H04W 4/24 | (2009.01) |
| H04L 29/06 | (2006.01) |
| G06Q 20/32 | (2012.01) |
| G06Q 20/34 | (2012.01) |
| G06Q 20/36 | (2012.01) |

(52) U.S. Cl.
CPC .......... *H04M 1/21* (2013.01); *G06Q 20/32* (2013.01); *G06Q 20/3572* (2013.01); *G06Q 20/36* (2013.01); *H04L 63/0853* (2013.01); *H04M 17/00* (2013.01); *H04M 17/02* (2013.01); *H04M 17/026* (2013.01); *H04W 4/24* (2013.01); *H04L 2463/102* (2013.01)

(58) Field of Classification Search
CPC ............. H04L 9/32; H04M 3/42; G06F 17/60
USPC ........... 455/418, 557, 575.8; 705/39, 41, 75; 713/701
See application file for complete search history.

(56) References Cited

U.S. PATENT DOCUMENTS

| | | |
|---|---|---|
| 2,950,048 A | 8/1960 | Luhn |
| 4,146,174 A * | 3/1979 | Darjany ................. G06K 7/084 235/449 |
| 4,507,550 A | 3/1985 | Fleer |
| 4,605,844 A | 8/1986 | Haggan |
| 4,614,861 A | 9/1986 | Pavlov |

(Continued)

FOREIGN PATENT DOCUMENTS

WO    WO89/01672    2/1989

OTHER PUBLICATIONS

"ICache" downloaded from http://www.icache.com/index.php on Mar. 18, 2011.

(Continued)

*Primary Examiner* — Myron K Wyche
(74) *Attorney, Agent, or Firm* — Otterstedt, Ellenbogen & Kammer, LLP

(57) ABSTRACT

A mobile electronic device such as a mobile phone includes wallet application software for receiving, storing, encrypting, and transmitting selected payment card data. A tab including a programmable magnetic stripe is associated with a controller for receiving transmitted payment card data and programming the stripe with selected data. The tab is mounted directly to the electronic device or to an attachment device removably coupled to the electronic device. The attachment device may comprise a case for the mobile electronic device that allows access to a user interface and display of the mobile electronic device.

27 Claims, 11 Drawing Sheets

(56) References Cited

U.S. PATENT DOCUMENTS

| | | | |
|---|---|---|---|
| 4,650,981 A | 3/1987 | Foletta | |
| 4,701,601 A | 10/1987 | Francini | |
| 4,768,163 A | 8/1988 | Clark | |
| 4,791,283 A | 12/1988 | Burkhardt | |
| 5,276,311 A | 1/1994 | Hennige | |
| 6,631,849 B2 | 10/2003 | Blossom | |
| 6,705,520 B1 | 3/2004 | Pitroda | |
| 7,003,495 B1 | 2/2006 | Burger | |
| 7,044,394 B2 | 5/2006 | Brown | |
| 7,784,687 B2 | 8/2010 | Mullen | |
| 2001/0011684 A1* | 8/2001 | Krause | G06K 7/084 235/492 |
| 2003/0004876 A1* | 1/2003 | Jacobson | G06Q 20/105 705/41 |
| 2004/0133787 A1 | 7/2004 | Doughty | |
| 2004/0177045 A1 | 9/2004 | Brown | |
| 2004/0188519 A1 | 9/2004 | Cassone | |
| 2005/0133606 A1 | 6/2005 | Brown | |
| 2005/0203765 A1 | 9/2005 | Maritzen | |
| 2006/0091223 A1 | 5/2006 | Zellner | |
| 2006/0124756 A1 | 6/2006 | Brown | |
| 2006/0161789 A1 | 7/2006 | Doughty | |
| 2007/0027804 A1* | 2/2007 | Vega | G06Q 20/10 705/39 |
| 2007/0131759 A1 | 6/2007 | Cox | |
| 2007/0241183 A1 | 10/2007 | Brown | |
| 2008/0059379 A1 | 3/2008 | Ramaci | |
| 2008/0126260 A1 | 5/2008 | Cox | |
| 2008/0222047 A1 | 9/2008 | Boalt | |
| 2009/0159707 A1* | 6/2009 | Mullen | G06K 19/06206 235/493 |
| 2010/0155470 A1* | 6/2010 | Woronec | G06Q 20/32 235/380 |
| 2010/0191650 A1* | 7/2010 | Ramachandran | G06Q 20/042 405/45 |
| 2012/0021810 A1* | 1/2012 | Terry | H04B 1/3888 455/575.8 |
| 2012/0191977 A1* | 7/2012 | Foster | H04L 9/3242 713/170 |

OTHER PUBLICATIONS

"iPhone 5 Rumors Already Percolating" downloaded from http://www.cnbc.com/id/42267469 on Mar. 18, 2011.

"Philips USA PH-62050 CD/MP3/MD-To-Cassette Adapter" downloaded from http://www.amazon.com/Philips-USA-PH-62050-MD-To-Cassette-Adapter/dp/B0007R4LI8 on Apr. 8, 2011.

"Point-to-Point Encryption" downloaded from http://www.elementps.com/software-providers/security/encryption/ on Mar. 29, 2011.

"Cassette tape adaptor" downloaded from http://en.wikipedia.org/wiki/Cassette_tape_adaptor on Apr. 8, 2011.

"Fix a Cassette Tape Adapter" downloaded from downloaded http://www.azega.com/fix-a-cassette-tape-adapter/ on Apr. 8, 2011.

"A Street Tech How-To:Building a Cheap Audio Interface for Your Car's Stereo" downloaded from http://www.streettech.com/archives_DIY/audioAdapter.html on Apr. 8, 2011.

"Smart card patent fight to continue, says court" downloaded from http://www.out-law.com/page-5066 on Apr. 8, 2011.

"Start accepting credit cards today." downloaded from https://squareup.com/ on Jun. 15, 2013.

"PrivaSys" downloaded from http://www.privasys.com/ on Jun. 15, 2013.

"Secure Digital" downloaded from http://en.wikipedia.org/wiki/Secure_Digital on Jun. 15, 2013.

"Magnetic stripe card" downloaded from http://en.wikipedia.org/wiki/Magnetic_stripe_card on Jun. 15, 2013.

"Luhn algorithm" downloaded from http://en.wikipedia.org/wiki/Luhn_algorithm on Jun. 15, 2013.

\* cited by examiner

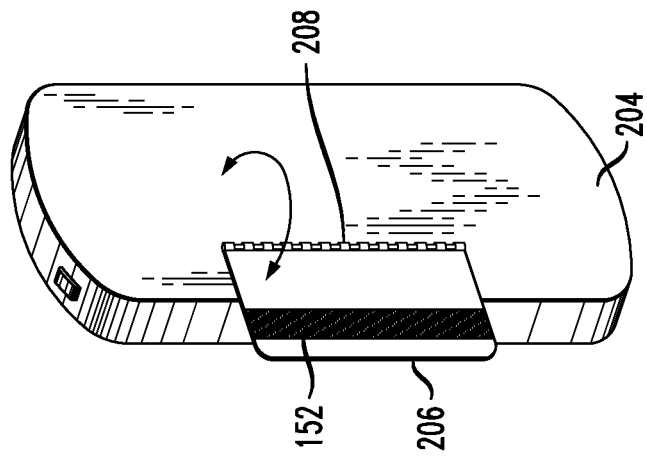
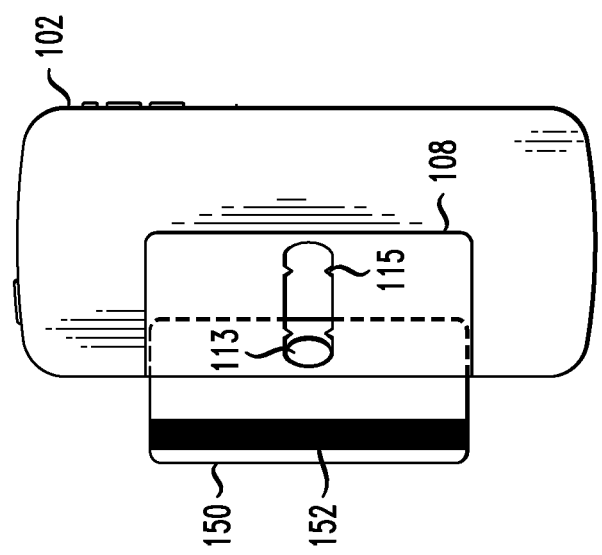

MAGNETIC STRIPE ATTACHMENT AND APPLICATION FOR MOBILE ELECTRONIC DEVICES

FIELD OF THE INVENTION

The present invention relates generally to the electronic and computer arts and, more particularly, to apparatus and methods for electronic payment.

BACKGROUND OF THE INVENTION

Cash alternatives such as payment cards are used in a variety of environments. Payment cards may include various mechanisms for storing and/or transmitting account information. Such mechanisms may include magnetic stripes and/or integrated circuit chips. In the case of cards having magnetic stripes, the card is swiped through a reader when used for a financial transaction, typically causing information relating to the user's account and the transaction to be communicated to a reader, through a payment processing network, and ultimately to the issuer of the card. Magnetic stripes used on payment cards comply with various standards that define such properties as the location of the magnetic stripe on the card and the data formats.

Many people have at least several payment cards from one or more issuers. Because carrying a large number of cards can be inconvenient, devices have been provided that include programmable magnetic stripes. The user can input data from a plurality of payment cards into such devices, thereby obviating the need for carrying the individual payment cards. A device of this type includes one card that takes the place of many. When making a financial transaction with the device, the magnetic stripe on the card within the device is programmed with the data from a particular card selected by the user from a list of payment cards whose data has been stored in the device. That card is swiped through a reader and processed in the same manner as an individual payment card.

SUMMARY OF THE INVENTION

Principles of the invention provide techniques for incorporating a card including a programmable magnetic stripe within a mobile device such as a cell phone or a personal digital assistant and applications for facilitating the use of the card.

In one aspect, an exemplary method includes opening an application on a mobile phone to display one or more payment card options on the mobile phone, selecting payment card data from a database within a mobile phone including data relating to one or more payment cards, causing the selected payment card data to be programmed onto a magnetic stripe located on a tab, moving the tab from a storage position on the mobile phone to a use position, swiping the tab through a magnetic card reader, causing the magnetic stripe to be read, returning the tab to the storage position on the mobile phone, and clearing the payment card data programmed onto the magnetic stripe.

In another aspect, an exemplary device comprises a housing, a tab movably attached to the housing and including a programmable magnetic stripe, a controller within the housing for programming the magnetic stripe with payment card data, a communication device configured to communicate information from a mobile electronic device to the controller, and a connecting device for removably attaching the housing to the mobile electronic device. The communication device may be a USB connector, an audio jack connector, a dock connector or other suitable connection equipment capable of receiving payment card data.

In accordance with a further aspect of the invention, an exemplary method includes the steps of opening an application on a mobile phone to display one or more payment card options on the mobile phone, selecting payment card data from a database within the mobile phone including data relating to one or more payment cards, causing the selected payment card data to be programmed onto a magnetic stripe located on a tab, moving the tab from a storage position on the mobile phone to a use position, swiping the tab through a magnetic card reader, causing the magnetic stripe to be read, returning the tab to the storage position on the mobile phone, and clearing the payment card data programmed onto the magnetic stripe.

An exemplary device according to an aspect of the invention includes a housing, a tab movably attached to the housing and including a programmable magnetic stripe, a controller within the housing for programming the magnetic stripe with payment card data, a communication device configured to electrically communicate information from a mobile electronic device to the controller and a connecting device for removably attaching the housing to the mobile electronic device. The connecting device may include a receptacle that can frictionally engage an end of the electronic device, e.g. a mobile phone.

A case for housing a mobile phone or other electronic device is provided in accordance with a further aspect of the invention. The case includes a housing defining an enclosure for containing a hand-held electronic device and at least one opening for providing access to the enclosure. A tab is movably attached to the housing and includes a programmable magnetic stripe. A controller within the housing is provided for programming the magnetic stripe with payment card data. A communication device on the housing, such as a USB connector or an audio jack connector, is configured to electrically communicate information from a mobile electronic device to the controller.

An assembly is provided in accordance with an additional aspect of the invention. The assembly includes a mobile phone including a housing, an operating system, wallet application software operatively associated with the operating system, a display, an antenna, and a user interface operatively associated with the wallet application software, the wallet application software being configured for entering payment card data, storing payment card data in a database, checking validity of payment card data, encrypting payment card data, and transmitting payment card data. A tab includes a programmable magnetic stripe. A controller is operatively associated with the tab and configured to program the programmable magnetic stripe with payment card data from the database. The tab may be mounted directly to the phone housing or alternatively to a case for the phone or an attachment device that can be coupled to the phone.

In still another aspect, an exemplary method includes the step of downloading a wallet application to a hand-held electronic device. The hand-held electronic device includes a processor and a memory coupled to the processor. The memory has at least one non-wallet application stored therein. Additional steps include opening the wallet application on the hand-held electronic device to display one or more payment card options on the hand-held electronic device; selecting payment card data from a database within the hand-held electronic device including data relating to one or more payment cards; causing the selected payment card data to be programmed onto a magnetic stripe located on a tab; moving the tab from a storage position on the hand-held electronic device to a use position; swiping the tab through a magnetic card reader, causing the magnetic stripe to be read; returning the tab to the storage position on the hand-held electronic device; and clearing the payment card data programmed onto the magnetic stripe.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including, for example, greater security in payment transactions than is ordinarily provided when magnetic stripe payment cards are used. In one aspect, potential for fraud is reduced via an online pre-validation process, increasing confidence that the person presenting the payment device is the lawful owner and that the payment device is a genuine payment device (and not a fraudster's copy) and has not been lost or stolen. In another aspect, note that the trend within the payment card industry (PCI) is towards end-to-end encryption and tokenization; in some instances, embodiments of the invention allow encryption of data in a wallet application and this encrypted data is sent directly through the terminal to the acquirer and ultimately the issuer, such that the terminal and the merchant are never exposed to unencrypted information.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2C shows a rear view of a mobile phone having a slidable tab including a programmable magnetic stripe;

FIG. 3A shows an exemplary case with a hinged programmable stripe attachment;

DETAILED DESCRIPTION OF PREFERRED EMBODIMENTS

Figure 1:
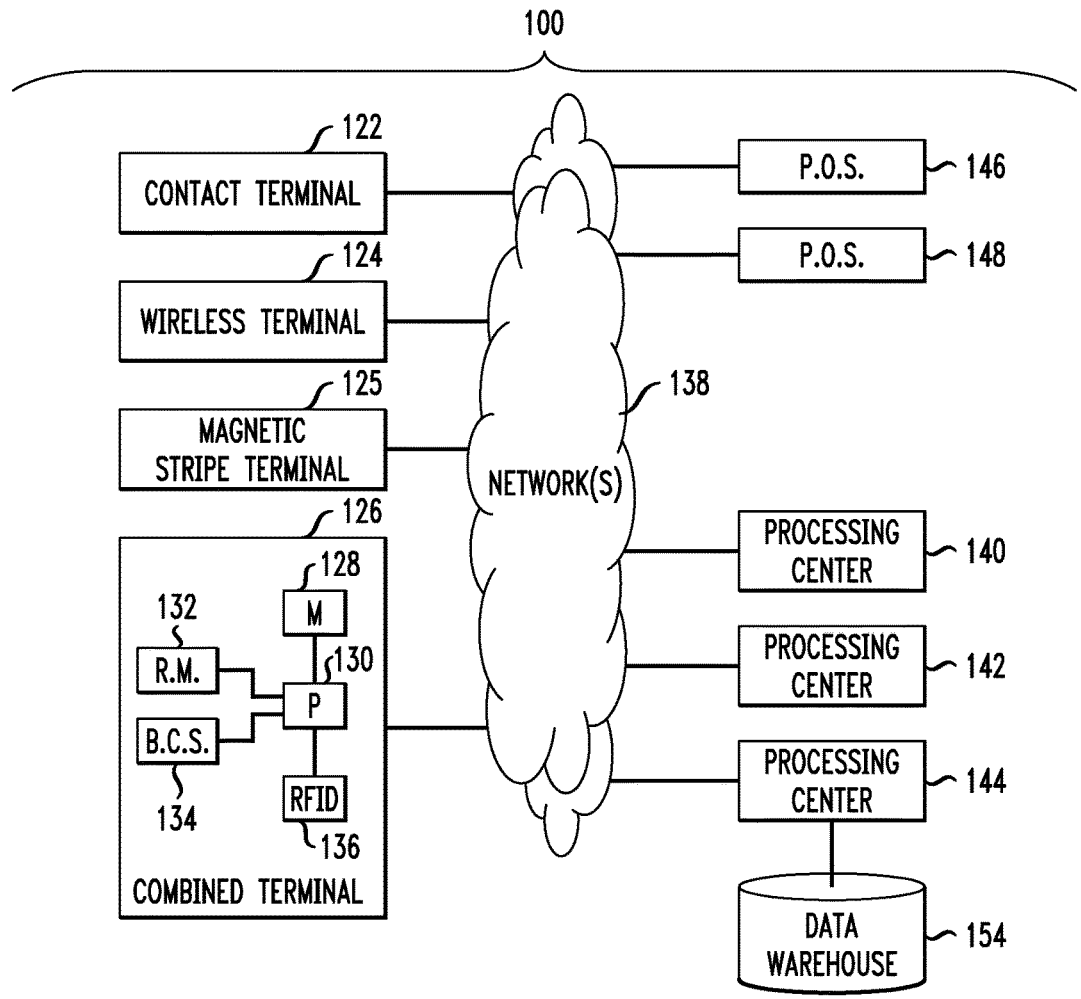
FIG. 1 shows an example of a system that can implement techniques of the present invention.
Figure 1:
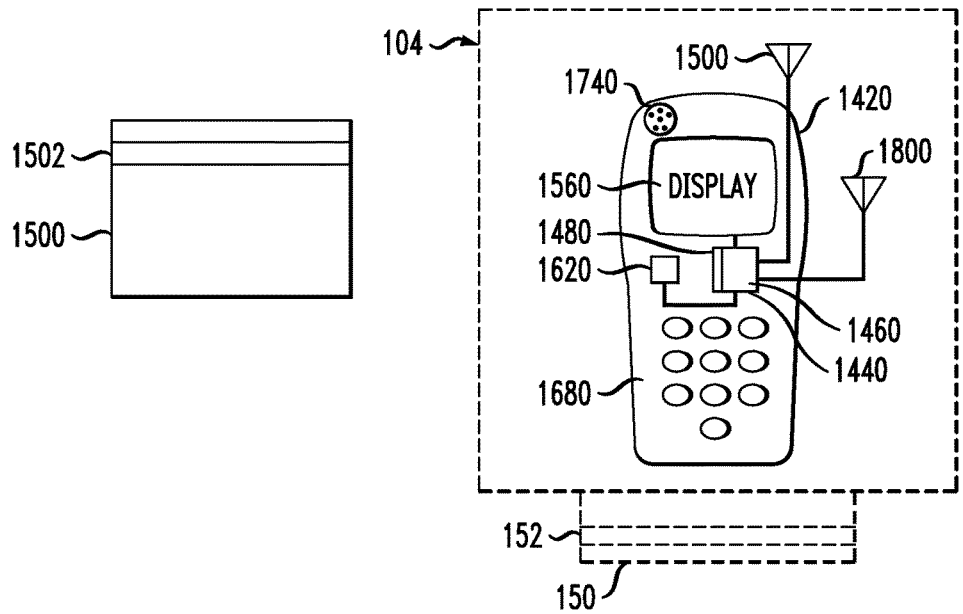

Attention should now be given to FIG. 1, which depicts an exemplary embodiment of a system 100 according to an aspect of the invention. As discussed below, one or more embodiments of the invention relate to a mobile electronic device that can be used in the same manner as a magnetic stripe payment card; in at least some instances, while being capable of providing superior transaction security. Furthermore, an appropriately configured cellular telephone handset, personal digital assistant (PDA), and the like can be used to carry out payments using a programmable magnetic stripe.

A number of different types of terminals can be employed with system 100. Such terminals can include a contact terminal 122 configured to interface with contact-type device, a wireless terminal 124 configured to interface with wireless device, a magnetic stripe terminal 125 configured to interface with a magnetic stripe device, or a combined terminal 126. Combined terminal 126 is designed to interface with any type of device. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with a card or device having an IC chip, contactless communication with a card or device having an antenna for RF communication, reading of a magnetic stripe, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 9 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with portable devices. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as product identification, from a UPC code or RFID tag on a product to be purchased. One or more of the processing centers 140, 142, 144 can include a database such as a data warehouse 154.

An appropriately configured cellular telephone handset 1420 can also be employed in the system 100. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 (i.e., the handset could have a second antenna for the payment application). Note that antenna 1800 is depicted schematically, but could be, e.g., a coil antenna as used in a typical "smart" card. In some embodiments, there is no wireless communication with the terminal and antenna 1800 is omitted; only magnetic stripe capability is provided.

Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary system 100 shown in FIG. 1. Keypad 1680 and speaker 1740 can be provided. The keyboard 1680 and/or the display 1560 may function as user interfaces for operating the telephone or any installed applications. The telephone handset 1420 can be configured for interaction with a magnetic card reader or be operatively associated with a case 104 or attachment that provides for such interaction. Cellular telephones known as smart phones include operating system software and allow users to install and run selected applications. As discussed further below, the telephone case or attachment may include a tab 150 having a programmable magnetic stripe 152 that is controlled through use of a "wallet" application within the cellular telephone.

Note also conventional payment card 1500 with conventional magnetic stripe 1502. In one or more embodiments, stripe 152 is selectively programmed to emulate stripes 1502 of several different payment cards.

Figure 2B:
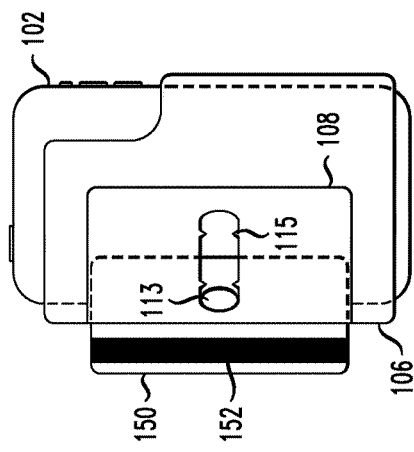
FIGS. 2A and 2B show front and rear views of an example of an assembly including a case employed with a mobile phone for implementing techniques of the invention.
Figure 2A:
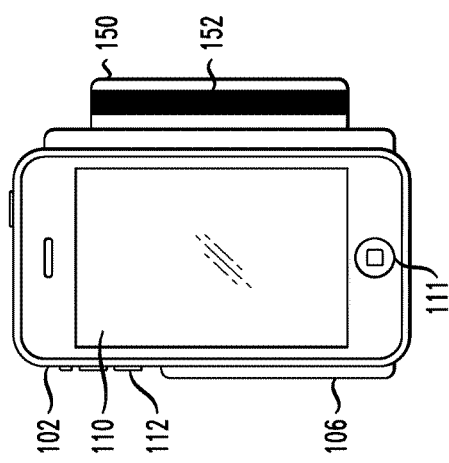

Attention should now be given to FIGS. 2A and 2B, which depict an exemplary embodiment of a mobile electronic device according to an aspect of the invention. In this embodiment, the electronic device is a cell phone 102 that is at least partially enclosed by a case 106. The case includes a slot 108 containing a tab-like payment card 150. It will be appreciated that the payment card 150 does not necessarily have the size and configuration of payment cards issued by banks and other financial institutions. It is sufficient that the tab or card 150 include a magnetic stripe 152 that can be programmed, that meets industry standards, and that can be swiped through a terminal 125 of the type that operates within a system such as that described with respect to FIG. 1. As discussed below, the magnetic stripe can be programmed to provide data relating to a particular payment card selected by a user. The payment card 150 employed in the device 102 can be used in the system 100 by swiping it through a magnetic reading head in a magnetic stripe terminal 125 or combined terminal 126 in the same manner as magnetic stripe payment cards issued by many financial institutions.

In the exemplary embodiment shown in FIGS. 2A and 2B, the case encloses part of the phone 102, leaving various portions of the front, top and bottom sides exposed. Part of the side of the phone also remains exposed. This configuration allows the user to have full access to all of the controls and connection ports provided on the phone, and does not impair the operation of the phone's microphone or speaker. The user can accordingly see the display 110 through the large open side of the case 106, which display also functions as a user interface in this embodiment. The user can also employ the home button 111, volume control buttons 112, etc. without interference from the case. The slot 108 is provided within the rear panel of the case. The case may be slightly enlarged in a portion of the rear panel to accommodate the card therein. The slot and card 150 are arranged such that the magnetic stripe 152 can be exposed by sliding the card in the direction of the magnetic stripe. A knob 113 affixed to the card 150 allows the user to slide the card 150 between exposed and retracted (stored) positions. It can be held in each position by frictional engagement with the case or with a detent mechanism. A slotted opening 115 in the rear panel limits the movement of the card such that the magnetic stripe is in the appropriate position for a card reader when the knob is at one end of the slotted opening and is fully within the case when the knob is at the opposite end of the slotted opening. The magnetic stripe 152 can be exposed through the side of the case 106 as shown or alternatively through the top or bottom of the case if the features of the phone and case permit such exposure. One or both sides of the card 150 may include a magnetic stripe. It will be appreciated that the configuration of the case will be dependent on the particular phone or other mobile electronic device for which it is intended.

The assembly described with respect to FIGS. 2A and 2B can be provided on the phone housing itself as shown in FIG. 2C. In each case, the magnetic stripe 152 is programmable and operatively associated with the hardware and application software as described below.

Figure 3B:
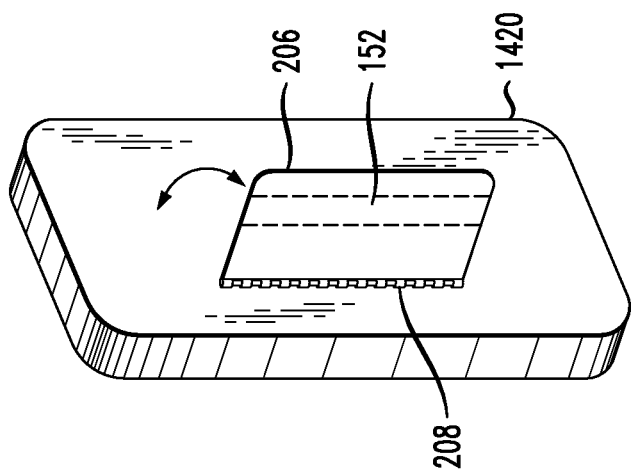
FIG. 3B shows an exemplary mobile phone with a hinged programmable stripe attachment.

Referring to the exemplary embodiment of FIG. 3A, an attachment device in the form of a case 204 for a cellular phone 1420 (not shown in FIG. 3A to avoid clutter) includes a tab 206 attached to the rear panel of the case by a hinge 208. The tab includes a magnetic stripe 152 on at least one side. The tab can be pivoted about the hinge between a stored position where it lies flat against the panel and a use position substantially perpendicular to the panel. The case may otherwise be similar to the case 106 described above in allowing access to the phone keyboard and display. The tab 206 and hinge 208 may alternatively be oriented ninety degrees from that shown in the figures such that the tab is pivotable towards and away from one of the shorter sides of the phone. The tab 206 may alternatively be mounted directly to a mobile phone 1420 having the necessary hardware and software described below. FIG. 3B shows a tab mounted to the rear surface of a phone.

Figure 4:
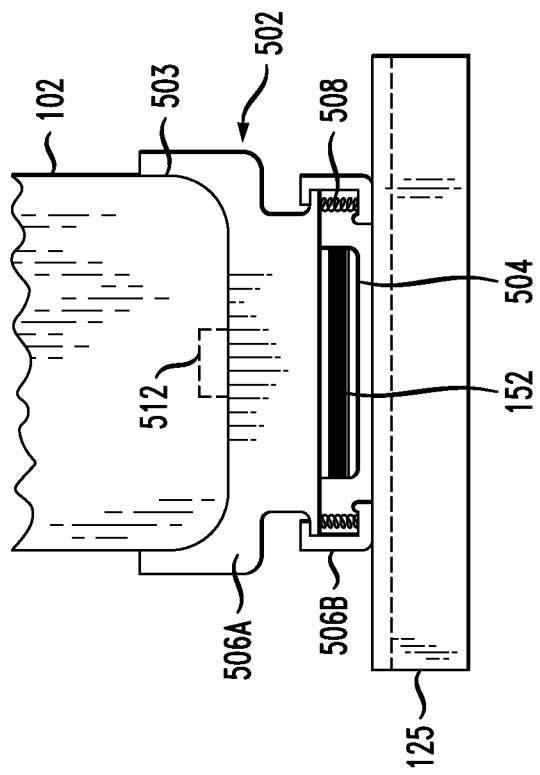
FIG. 4 is a schematic illustration of an attachment device including a payment tab or card as used in conjunction with a magnetic card reader.

A further exemplary embodiment of an attachment device 502 including first and second housing portions 506A, 506B and a tab 504 having a programmable magnetic stripe 152 is shown in FIG. 4. In this embodiment, the attachment device does not house a significant portion of the phone 102 in the manner of the case 104. It is instead mechanically connected to one end of the phone casing by a portion 503 that defines a receptacle that fits over one end of the phone. This portion may include rubber (not shown) or other material that enhances the frictional engagement of the device 502 to the phone housing. The tab 504 is preferably maintained in a storage position until the user wishes to swipe the tab through a magnetic stripe terminal 125. In this embodiment, springs 508 between the housing portions urge the housing portions apart, thereby urging the tab towards the storage or retracted position within the second housing portion. When the attachment device is pressed against the edge of the reader within a magnetic stripe terminal 125, the springs are compressed. This causes the first housing portion and attached tab to move downwardly and into the slot of the reader. Once a swipe is completed and pressure is no longer exerted on the attachment, the springs cause the housing portions to return to their original positions and the tab to return to the storage position where the magnetic stripe 152 is not exposed. The attachment is preferably much smaller than the dimensions of the phone so that the phone/attachment device assembly can be conveniently carried by the user in the same manner in which he/she is accustomed. While removable, it is ideally coupled to the phone at all times so that the user always has access to his/her financial accounts. The attachment device 502 may alternatively include a tab that is deployed and stored in a similar manner as described above with respect to the phone cases 104 and 204. It will further be appreciated that the attachment device may be adapted for affixation to one of the sides of a phone rather than an end.

The cases 104, 106, 204 and the attachment device 502 are coupled electrically as well as mechanically to the phones 102, 1420, respectively, though they may include their own power supplies (not shown; it is presently believed preferable that power be provided from the phone rather than having a power supply in the attachment device). Electrical coupling can be provided by USB connection, audio jack connection or other available technique on the particular phone. In the embodiment of FIG. 4, a dock connector 512 on the bottom of the phone is employed to electrically connect the attachment device to the phone 102. Mechanical coupling can be provided by the electrical coupling and/or by other techniques such as frictional engagement or hook and loop fasteners (not shown). The operation of the programmable magnetic stripe is designed to be at least partially controlled through the use of a software application stored within the phone. Various platforms have been developed for mobile applications including Symbian, Android, Windows Mobile, BREW, Blackberry and iOS. The software architecture employed depends on the particular platform employed by the manufacturer of the mobile electronic device.

Figure 5A:
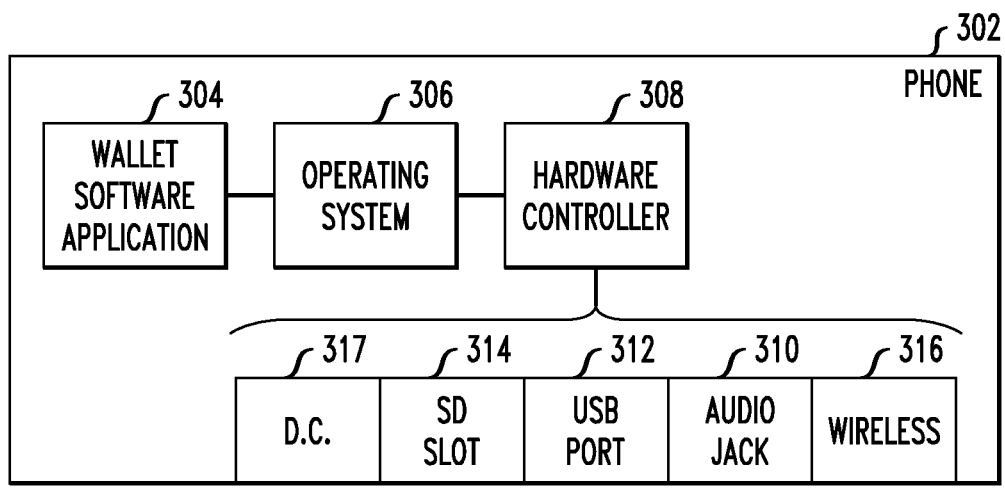
FIG. 5A is a block diagram of a mobile phone including wallet application software.
Figure 5B:
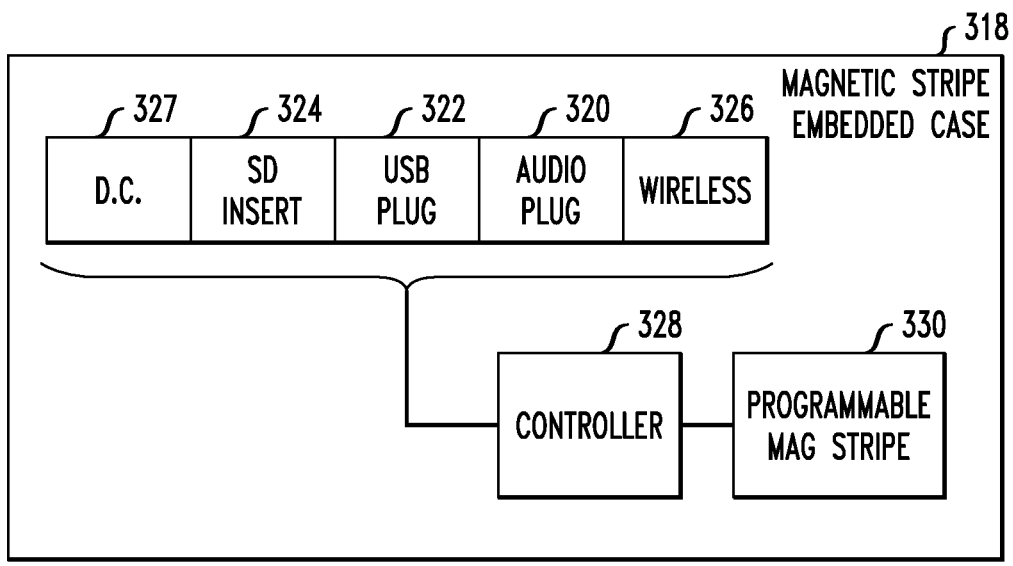
FIG. 5B is a block diagram of an attachment device including a programmable magnetic stripe for use with the mobile phone depicted in FIG. 5A.

FIG. 5A provides a block diagram of a phone 302 similar to the phones 1420 shown in FIG. 1 or phone 102 in FIGS. 2A and 2B and including the wallet application software 304 that interfaces with the phone's operating system 306. Block 304 represents executable code stored in a non-volatile memory of the phone; when the application is opened this executable code is loaded into a memory associated with the processor and executed by the processor. At least portions of the OS 306 may be located in the ROM of the phone's processor and in some instances, portions may be loaded from another non-volatile memory when the phone boots up. A hardware controller 308 allows the application software 304 to output data to any of the external communication avenues such as the audio jack 310, universal serial bus (USB) port 312, SD (secure digital) slot 314 and/or a wireless interface 316. Another non-limiting exemplary communications avenue is a dock connector 317, such as a dock connector ("D.C.") for a smart phone or similar device; for example, a thirty pin dock connector. Hardware controllers for controlling physical interface such as 310, 312, 314, 316, and 317 are, in and of themselves, known to the skilled artisan. Controller 308 is preferably coupled to a processor and memory of the phone by a bus or other suitable connection, and preferably receives data from the application executing on the processor. The phone has a power supply such as that disclosed in FIG. 1. The phone case or attachment 318 shown in FIG. 5B may comprise any one of the cases 104, 106, 204 or attachment 502 discussed above. The case or attachment 318 includes one or more reciprocal connections 320, 322, 324. 326, 327 for respectively coupling it to the communications avenues 310, 312, 314, 316, 317 provided on the phone. A controller 328 (implemented for example in all hardware or hardware plus firmware) obtains data from the phone 302 via one of the communications avenues and programs the programmable magnetic stripe 330 to mimic a payment card of interest.

A variety of known techniques can be employed to implement the programmable magnetic stripe and controller. In some instances, electromagnetic coils or thin film technology can be employed. A magnetic array with a plurality of magnetic transducer write heads could be positioned underneath the magnetic stripe; one at each bit position, to write to the stripe the data corresponding to the card it is desired to emulate. The controller takes as input the data for the card it is desired to emulate and applies the appropriate signal to each write head to set the corresponding bit to the appropriate value.

In some embodiments (see, e.g., FIG. 11), a conventional magnetic stripe of appropriate coercivity is programmed to emulate the desired card by swiping it in a conventional-type magnetic stripe writer (encoder). The controller takes as input the data for the card it is desired to emulate and encodes it on the stripe in a well-known manner.

In some cases (for example, instances of the magnetic array where the array is in the tab), the tab has cabling (omitted from the figures for clarity) running to it to carry out the programming. In other cases (for example, magnetic stripe encoder and instances of the magnetic array where the array is in the case or phone body underneath the tab), no cabling to the tab is needed.

Figure 6:
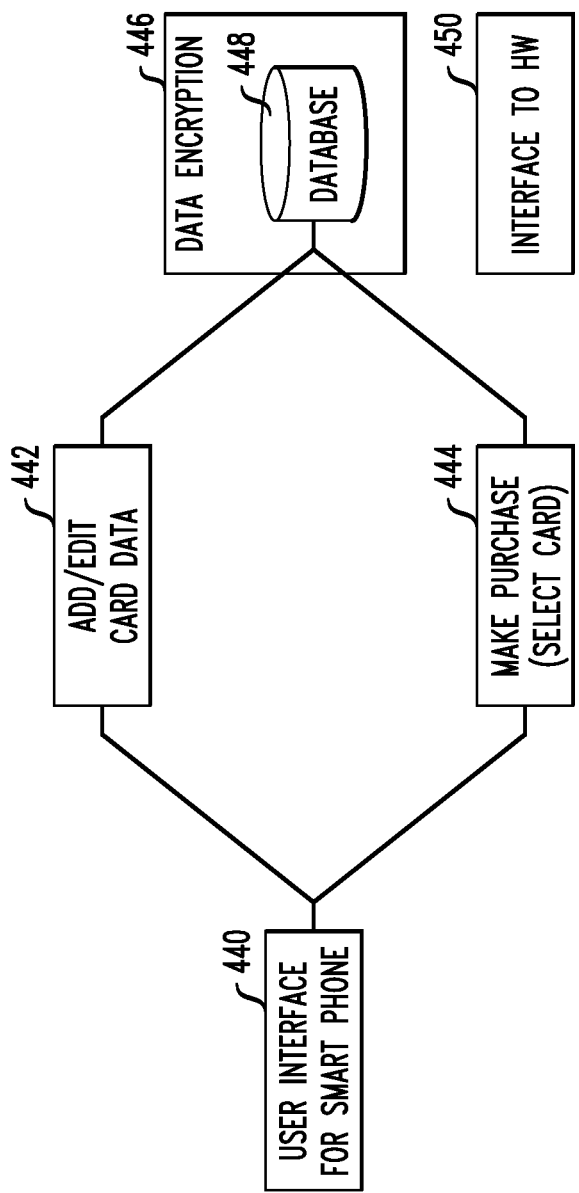
FIG. 6 is a block diagram showing the functions of the wallet application software within the phone depicted in FIG. 5A.

FIG. 6 provides a block diagram of the wallet software application 304 stored in the application memory of the phone 302 and its association with other phone components. The application is preferably a downloadable application that runs on a smart phone. The user interface 440, which could be a keyboard and/or display as shown in FIG. 1, allows adding payment card data 442, creating or editing card identifying information to be displayed, and provides the ability to select a payment card (per block 444) in order to make a purchase. The payment card data, whether added or edited, is stored in a database 448 within the application 304 on the phone 302. The storage is preferably common storage that can be accessed by the application and through the use of software encryption the data is secured, as indicated at the data encryption block 446. When making a purchase, the user selects one of the payment cards having data stored in the database 448. The data is read as per block 444 and provided to the hardware interface controller 308. Thus, one or more components in the wallet block diagram comprise software components stored in a tangible, computer-readable storage medium and implemented on a processor of a smart phone. The database would store its data in a non-volatile memory on the phone 302. The wallet application is preferably configured to require the use of a personal identification number (PIN) to unlock the application and allow the user to select and use a chosen payment card. The PIN is preferably different from the PIN associated with any of the payment cards stored in the database 448 although the user could choose to have the same PINs for everything. The PINs associated with the user's payment cards are not stored in the application. While the wallet software application is preferably incorporated in the phone's internal application memory, it could be stored externally in a suitable device such as a memory card.

Block 440 represents the physical input/output hardware and the corresponding drivers which allow the same to interface with routines 442, 444, as well as code which allows selecting routine 442 or routine 444. Block 448 represents non-volatile physical memory, the data stored therein, and the corresponding software, embodied in a tangible, computer-readable, recordable storage medium, which controls access and queries when executed on a suitable hardware processor. Block 442 represents software, embodied in a tangible, computer-readable, recordable storage medium, which carries out the corresponding logic and/or commands in FIGS. 7A and/or 713 when executed on a suitable hardware processor. Block 444 represents software, embodied in a tangible, computer-readable, recordable storage medium, which carries out the corresponding logic and/or commands in FIG. 8 when executed on a suitable hardware processor.

Figure 7A:
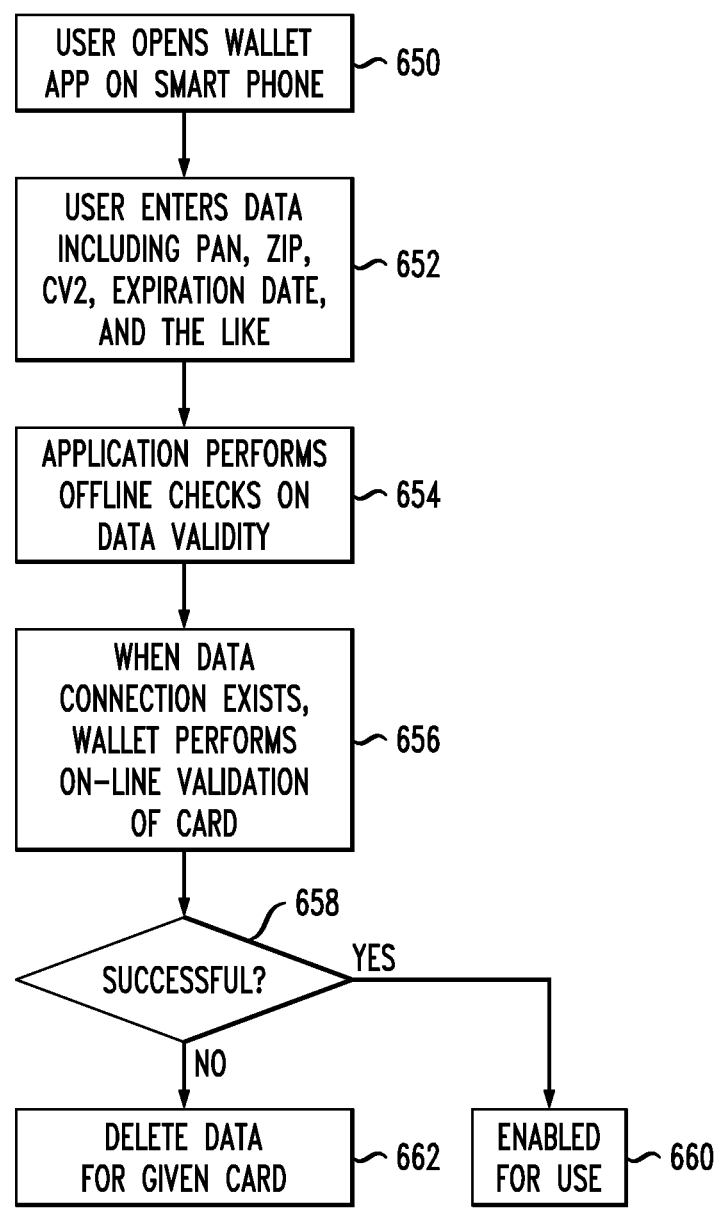
FIGS. 7A and 7B show, respectively, two possible techniques for loading payment card data into a database within a mobile electronic device.
Figure 7B:
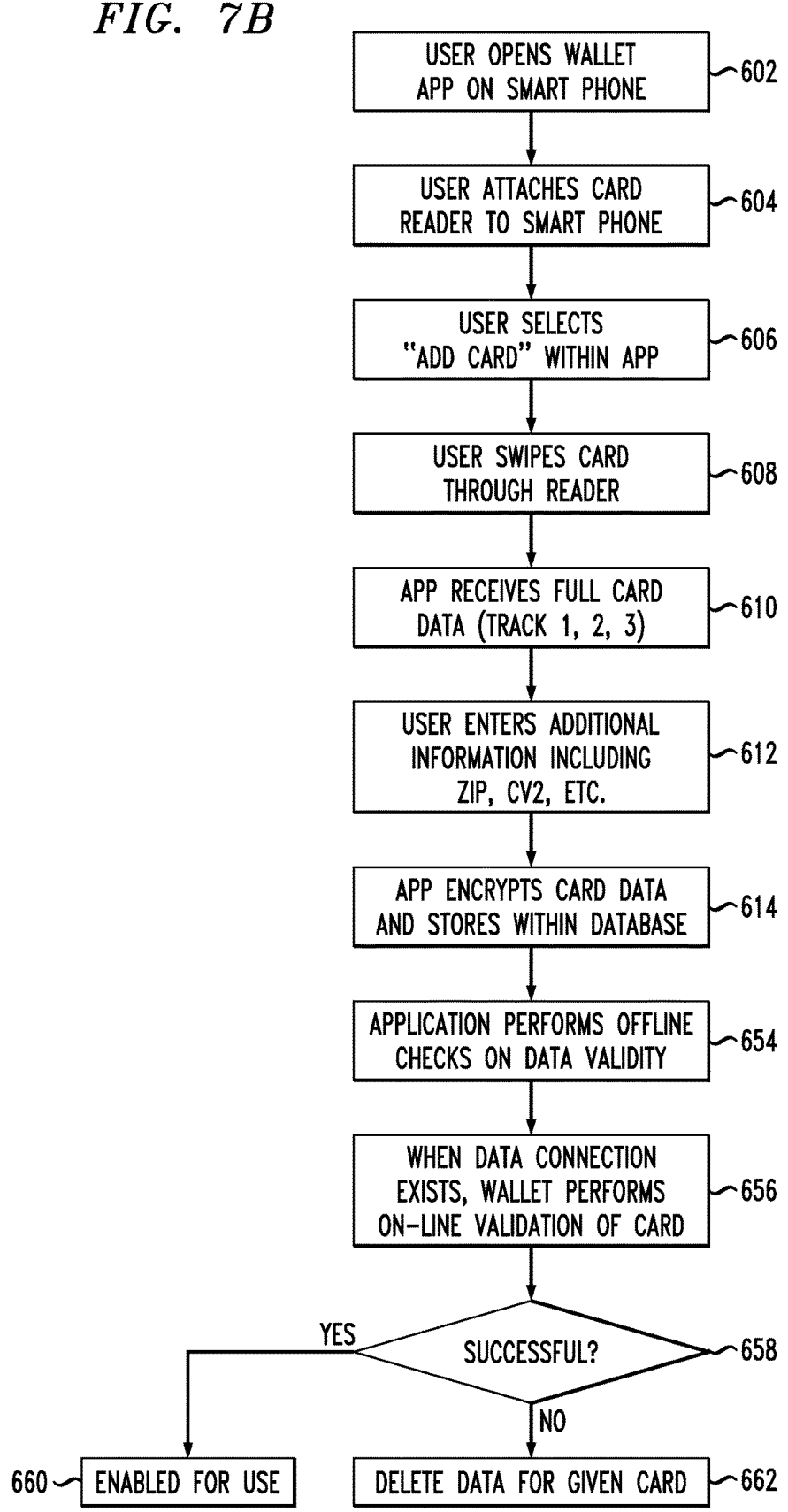

FIGS. 7A and 713 show, respectively, two possible techniques for loading payment card data into the database 448 in the phone 302, namely manually and using a magnetic card reader. Either or both can be provided as options. In the case of manual loading, the user opens the wallet application 304 on the phone in step 650; for example, by interfacing with the physical input/output interface on the phone, causing commands to be sent to the processor to load the application from persistent memory into memory associated with the processor for execution. The user then enters payment card data in step 652 via the user interface 440; for example using a stylus, keypad, or the like. This data to be entered includes information such as the primary account number (PAN), zip code, security code (CV2), and expiration date. Once entered, the application 304 (for example, block 442 thereof interfacing with the database 448) performs offline checks in step 654 directed to the validity of the entered data. The Luhn algorithm and/or other methods can be used to detect data entry errors. The application 304 preferably causes the display on the phone to indicate when an error has been detected. The wallet application 304 causes on-line validation of the entered card data in step 656 (for example, block 442 thereof interfacing with an issuer host over a network). Such validation could involve, for example, sending an authorization request for a nominal amount or simply validating the bank identification number (BIN) ranges. Validation preferably involves providing information that is not stored on the payment card (but is known to the authorized cardholder cardholder), such as a ZIP code, to help ensure that usage is only by an authorized cardholder. As seen at 658, a determination is made as to whether the validation was successful. If YES, as at 660, the card is enabled for use. i.e., the wallet application and programmable magnetic stripe can now be used to emulate the actual card. If NO, as at 662, all data for the particular actual card that failed validation is erased from the smart phone or the like and the wallet application and programmable magnetic stripe are incapable of being used to emulate the actual card. Steps 656-662 may be carried out, for example, by block 442 receiving a response from the issuer over the network, evaluating same as per block 658, and interacting with database 448 as needed (for example, to delete the data for the card that failed validation, as per 662).

Data entry using a reader, which is preferred as CV1 can be read from the magnetic stripe of the actual card, involves opening the wallet application 304 on the phone 302 in step 602, in the same manner as described above. In step 604, the user attaches the card reader to the phone. Commercially available card readers, known in themselves to the skilled artisan, plug into the audio jacks of smart phones and allow mobile payments and could be used in performing this step. In step 606, the user selects a function such as "add card" in instances where a payment card is being added to the database 448; for example by interfacing with module 442 via interface 440 and the corresponding input/output hardware. The user then swipes that portion of the actual payment card 1500 to be emulated that includes the magnetic stripe 1502 through the reader in step 608. In step 610, the application 304 receives the full card data, namely the same data that would be captured by a data terminal such as the terminal 125 in the system 100 if an actual transaction were taking place (for example, by hardware interface 450 cooperating with module 442). Magnetic cards use various tracks for financial transactions, known as tracks 1, 2 and 3. The data in such tracks is received by the application. In step 612, the user enters any additional information, such as the ZIP code and the CV2, which may be required; for example by interfacing with module 442 via interface 440 and the corresponding input/output hardware. The phone display may provide prompts for the required entries. In step 614, the application encrypts the card data and stores it in the database 448; for example using module 446. Offline and online checking can be performed in the same manner as performed during manual data entry as described above; thus, the steps 654, 656, 658, 660, and 662 have the same numbers as in FIG. 7A.

Figure 8:
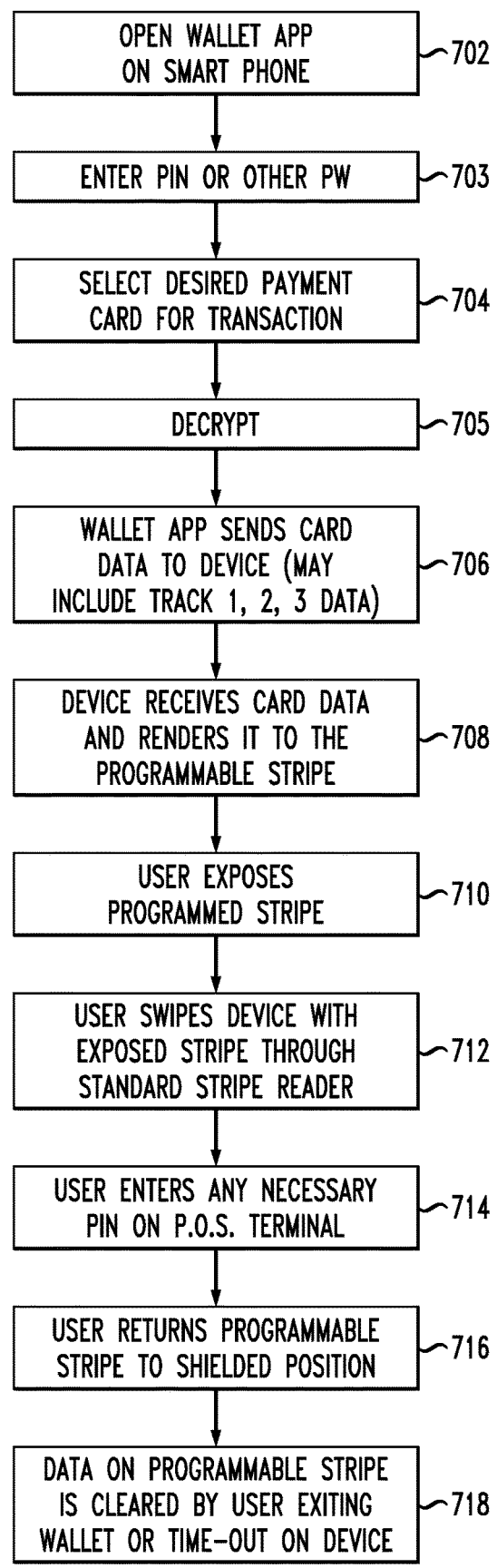
FIG. 8 is a flow diagram showing use of the assembly for a payment transaction.

The manner in which the phone 302 and case or attachment device 318 can be used following download of the wallet application 304 and the entry of payment card data is shown in FIG. 8. In step 702, the user opens the wallet application on the smart phone 302, in the same manner as described above, and now interacts with module 444. One or more payment card options are displayed upon opening the application or following a command entered by the user. As seen at step 703, the entry of a password (which may be set up when the application is downloaded) is preferably required prior to opening the application. To avoid cluttering the flow chart, step 703 is not shown as a decision block; however, it will be appreciated that if the correct PIN or other password is not entered (at least after a reasonable number of tries), the application remains locked and the data inaccessible. In step 704, the user selects the desired payment card for the transaction (for example, by scrolling through a list of available cards in the on-phone database 448). In step 705, the card data is decrypted, if necessary, prior to sending it to the device for rendering to the programmable magnetic stripe, for example by having module 444 interact with modules 446 and 448. Currently, magnetic stripe data is not encrypted.

However, in some instances, at least a portion of the card data may remain encrypted from end-to-end. A number of different encryption techniques are possible; for example, the Advanced Encryption Standard (AES) is a non-limiting example. The skilled artisan will be familiar with a number of end-to-end encryption technologies per se. Most of the providers of such technologies focus on encryption of unencrypted card data when it is swiped through a terminal. In some embodiments, such existing technology is employed in a different manner to encrypt card data when swiped into the phone or other device such that when transmitted to the terminal in accordance with one or more embodiments of the invention, it remains encrypted and continues on from that point as in existing techniques. In this regard, in at least some instances when little or no change to existing infrastructure is desired, at least a portion of the PAN may be provided "in the clear" to enable routing within the payment network, while portions not needed for routing could be end-to-end encrypted.

In step 706, the wallet application sends the card data to the phone case or attachment 318 (e.g. the track 1, 2, and 3 data), for example by having module 444 interact with hardware interface 450. In step 708, the controller 328 receives the card data and renders it to the programmable magnetic stripe 152. In step 710, the user exposes the programmable stripe. Various ways of exposing the stripe are discussed with respect to FIGS. 2-4. In step 712, the user, holding the phone casing or the phone, swipes the exposed stripe through the standard card reader. In step 714, the user enters any PIN into the point-of-sale (POS) terminal (e.g., PIN debit card). In a preferred but non-limiting approach, the password needed to open the application is different from this PIN. In step 716, the user returns the programmable stripe to the shielded position. As discussed with respect to the embodiment of FIG. 4, retraction of the tab including the magnetic stripe can be automatic. In step 718, the data on the programmable stripe is cleared. Such clearing can be caused, for example, by the user exiting the wallet application, the return of the tab to the storage position, and/or a time-out generated by the wallet application. Exit from the application or time out are preferred to avoid the need for a sensor detecting retraction of the tab. A time out may be driven, for example, by controller 328, while a user-driven exit may in turn be driven, for example, by module 444. It will be appreciated that the embodiments of FIGS. 2C and 3B are used in a similar manner as the controller will be incorporated within the phone handsets as opposed to a case or other phone attachment device.

Figure 11:
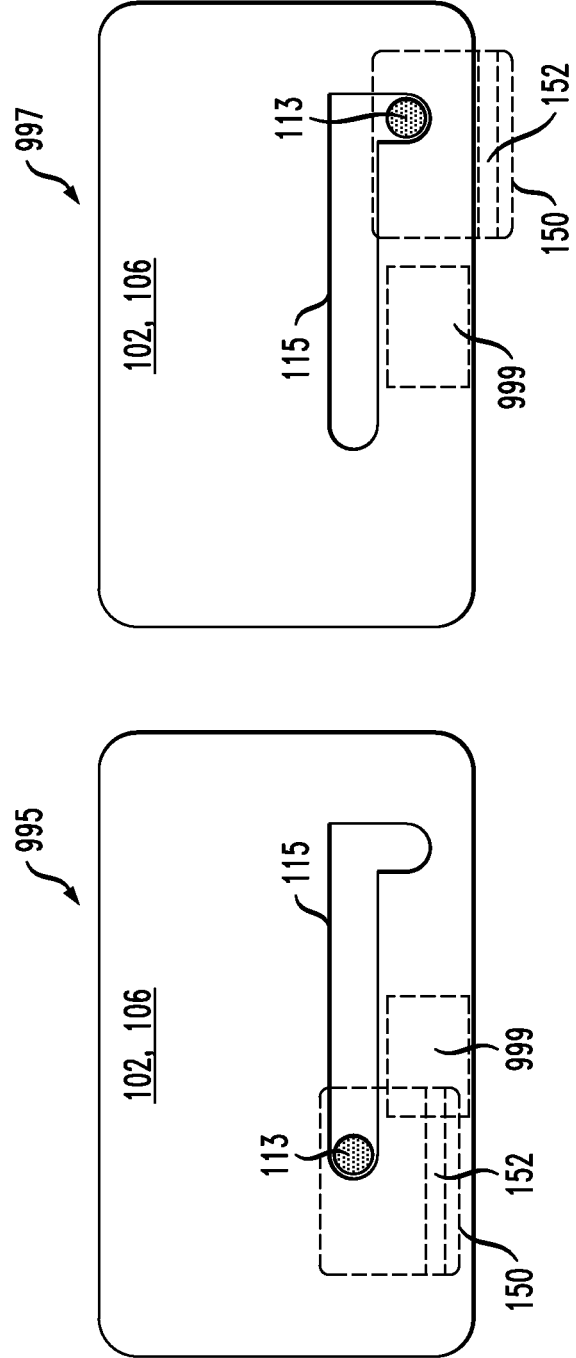
FIG. 11 shows an exemplary configuration, according to an aspect of the invention, usable with a mobile phone or other portable electronic device and/or with a case for same.

FIG. 11 shows a case wherein the programmable magnetic stripe is a conventional magnetic stripe 152 of appropriate coercivity which is programmed by swiping in a conventional-type magnetic stripe encoder 999 to emulate the desired card. The controller in such an instance takes as input the data for the card it is desired to emulate and encodes it on the stripe in a well-known manner using encoder 999. In this case, the slot 115 is L-shaped. FIG. 11 is equally representative of a phone (device) or phone (device) case embodiment as indicated at 102, 106. In operation, the desired card is selected, knob 113 attached to the tab with the magnetic stripe is initially as at view 995, is swiped to the right to cause the stripe to pass through encoder 999 to be encoded, and is then moved down the short length of the L to expose the stripe for swiping in the reader, as at 997.

Figure 9:
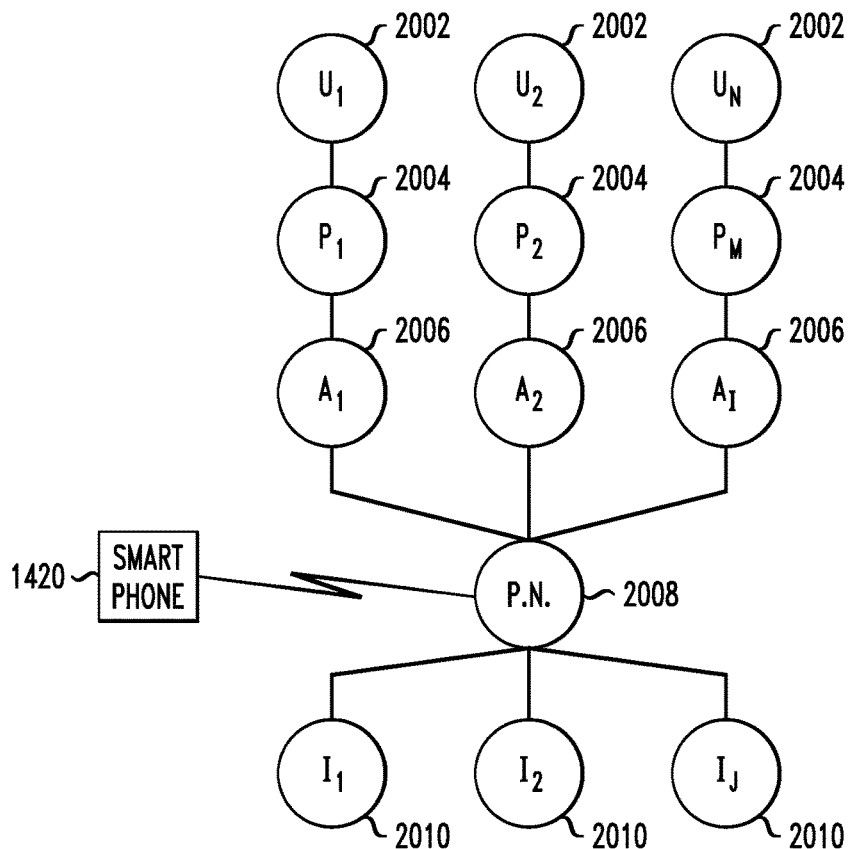
FIG. 9 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 9, an exemplary relationship among multiple entities is depicted in the context of a card payment process. A number of different users 2002, $U_1$, $U_2$ . . . $U_N$, interact with a number of different merchants 2004, $P_1$, $P_2$ . . . $P_M$. Users 2002 could be, for example, consumers, payers, or other holders of payment cards. Merchants 2004 interact with a number of different acquirers 2006, $A_1$, $A_2$ . . . $A_I$. Acquirers 2006 interact with a number of different issuers 2010, $I_1$, $I_2$ . . . $I_J$, through, for example, a single operator 2008 of a payment network configured to facilitate transactions between multiple issuers and multiple acquirers; for example, MasterCard International Incorporated, operator of the BANKNET® network (an exemplary VPN), or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the invention may be employed with other kinds of payment networks, for example, proprietary or closed payments networks with only a single issuer and acquirer (e.g., "store" card). Indeed, in some cases, techniques of the invention can even be used to emulate loyalty cards. The term "payment card," as used in the claims, should be construed to cover loyalty cards as well unless expressly recited as a "payment card other than a loyalty card."

As seen in FIG. 9, in some instances, the owner or user of a smart phone 1420 or similar payment device configured in accordance with one or more embodiments of the invention accesses a web site or the like of the payment network operator 2008 to download the application 304 to the smart phone 1420 or similar payment device. This feature is optional. Regardless of presence of absence of this feature, advantageously, in one or more embodiments, the existing infrastructure shown in FIG. 9 requires no change. Note that the connection between phone 1420 and payment network operator 2008 may very well be indirect; for example, payment network operator 2008 may provide a "golden copy" of the application to a third party (e.g., APPLE ITUNES STORE or Google's ANDROID MARKET) and phone 1420 downloads over the web from such third party.

Recapitulation

Given the discussion thus far, it will be appreciated that, in general terms, an exemplary method, according to an aspect of the invention, includes the steps of opening an application on a mobile phone to display one or more payment card options on the mobile phone, selecting payment card data from a database within the mobile phone including data relating to one or more payment cards, causing the selected payment card data to be programmed onto a magnetic stripe located on a tab, moving the tab from a storage position on the mobile phone to a use position, swiping the tab through a magnetic card reader, causing the magnetic stripe to be read, returning the tab to the storage position on the mobile phone, and clearing the payment card data programmed onto the magnetic stripe.

An exemplary device according to an aspect of the invention includes a housing, a tab movably attached to the housing and including a programmable magnetic stripe, a controller within the housing for programming the magnetic stripe with payment card data, a communication device configured to electrically communicate information from a mobile electronic device to the controller and a connecting device for removably attaching the housing to the mobile electronic device. The connecting device may include a receptacle that can frictionally engage an end of the electronic device, e.g. a mobile phone.

A case for housing a mobile phone or other electronic device is provided in accordance with a further aspect of the invention. The case includes a housing defining an enclosure for containing a hand-held electronic device and at least one opening for providing access to the enclosure. A tab is movably attached to the housing and includes a programmable magnetic stripe. A controller within the housing is provided for programming the magnetic stripe with payment card data. A communication device on the housing, such as a USB connector or an audio jack connector, is configured to electrically communicate information from a mobile electronic device to the controller.

An assembly is provided in accordance with an additional aspect of the invention. The assembly includes a mobile phone including a housing, an operating system, wallet application software operatively associated with the operating system, a display, an antenna, and a user interface operatively associated with the wallet application software, the wallet application software being configured for entering payment card data, storing payment card data in a database, checking validity of payment card data, encrypting payment card data, and transmitting payment card data. A tab includes a programmable magnetic stripe. A controller is operatively associated with the tab and configured to program the programmable magnetic stripe with payment card data from the database. The tab may be mounted directly to the phone housing or alternatively to a case for the phone or an attachment device that can be coupled to the phone.

Another exemplary method, according to an aspect of the invention, includes the step of downloading a wallet application to a hand-held electronic device (e.g., as described with respect to FIG. 9). The hand-held electronic device includes a processor and a memory coupled to the processor. The memory has at least one non-wallet application stored therein. Additional steps include opening the wallet application on the hand-held electronic device, for example as per step 702, to display one or more payment card options on the hand-held electronic device; selecting payment card data from a database within the hand-held electronic device including data relating to one or more payment cards, for example as per step 704; and causing the selected payment card data to be programmed onto a magnetic stripe located on a tab, for example as per steps 706 and 708 (and optionally 705). Further steps include, for example as per step 710, moving the tab from a storage position on the hand-held electronic device to a use position; swiping the tab through a magnetic card reader, causing the magnetic stripe to be read, for example as per step 712; returning the tab to the storage position on the hand-held electronic device, for example as per step 716; and clearing the payment card data programmed onto the magnetic stripe, for example as per step 718.

Optional additional steps include downloading the non-wallet application to the hand-held electronic device and opening the non-wallet application on the hand-held electronic device. The non-wallet application may include, for example, a music application, a map application, or a game application.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, payment devices such as the phone 102, 302, 1420, a host, server, and/or processing center 140, 142, 144 (optionally with data warehouse 154) of a merchant, issuer, acquirer, processor, or operator of a network operating according to a payment system standard (and/or specification), and the like. Firmware might be employed, for example, in connection with payment devices such the phone 102, 302, 1420 and the reader 132. Firmware provides a number of basic functions (e.g. display, print, accept keystrokes) that in themselves do not provide the final end-use application, but rather are building blocks; software links the building blocks together to deliver a usable solution.

Figure 10:
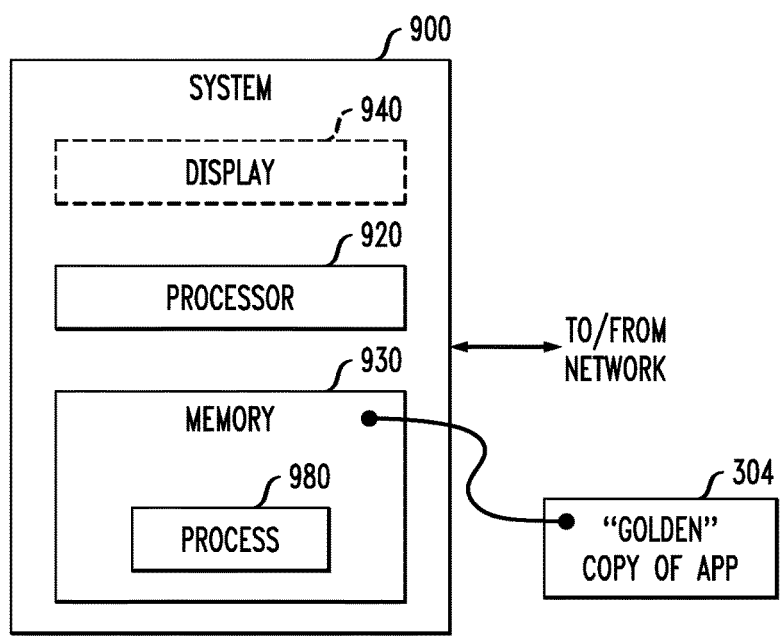
FIG. 10 is a block diagram of an exemplary computer system useful in one or more embodiments of the invention.

FIG. 10 is a block diagram of a system 900 that can implement some aspects or processes of the invention, such as providing software 304 for download to a phone or other device. As shown in FIG. 10, memory 930 configures the processor 920 to implement one or more aspects of the methods, steps, and functions disclosed herein (collectively, shown as process 980 in FIG. 10). Different method steps can be performed by different processors (e.g., processor on phone and processor 920). The memory 930 could be distributed or local and the processor 920 could be distributed or singular. The memory 930 could be implemented as an electrical, magnetic or optical memory, or any combination of these or other types of storage devices. It should be noted that if distributed processors are employed, each distributed processor that makes up processor 920 generally contains its own addressable memory space. It should also be noted that some or all of computer system 900 can be incorporated into an application-specific or general-use integrated circuit. For example, one or more method steps could be implemented in hardware in an ASIC rather than using firmware. Display 940 is representative of a variety of possible input/output devices (e.g., displays, mice, keyboards, and the like). The notation "to/from network" is indicative of a variety of possible network interface devices. As alluded to above, in one or more embodiments, an application written by the payment network operator 2008 or its contractor is supplied to a third party such as APPLE ITUNES or GOOGLE'S ANDROID MARKET as a "golden" copy which is repeatedly downloaded to smart phones or other handheld electronic devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out certain methods or form certain apparatuses as described herein (e.g., downloaded from a system 900 to a smart phone, or provided to the system 900 as the aforementioned "golden copy"). A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal, another device could be a physical memory media associated with a smart phone or other handheld electronic device, another device could be a physical memory media associated with an attachment to a smart phone or other handheld electronic device, and/or another device could be a physical memory media associated with a processing center of an issuer or the like (e.g., a location of system 900 which makes the application available for download). As used herein, a tangible computer-readable recordable storage medium is intended to encompass a recordable medium, examples of which are set forth above, but expressly excludes a transmission medium or signal per se. A tangible computer-readable recordable storage medium stores instructions therein in a non-transitory manner.

The computer systems and servers (and "smart" phones or other handheld electronic devices) described herein each contain a memory that will configure associated processors to implement the methods, steps, and functions disclosed herein. Such methods, steps, and functions can be carried out, by way of example and not limitation, by processing capability on elements 102, 302, 1402, 900, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information stored on a tangible computer-readable recordable storage medium on a network is still within a memory because the associated processor can retrieve the information from the network.

Thus, elements of one or more embodiments of the invention, such as, for example, 102, 302, 1402, 900 can make use of computer technology with appropriate instructions to implement method steps described herein. Some aspects (e.g., download) can be implemented at least in part, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer or smart phone or other handheld electronic device, and that such program may be embodied on a tangible computer-readable recordable storage medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system running a server program. It will be understood that such a physical server may or may not include a display, keyboard, or other input/output components. A "host" includes a physical data processing system running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures and described as being implemented in software running on hardware; for example, modules to implement blocks 440, 442, 444, 446, and 448 (the latter also includes a physical memory to store the data in the database). The method steps can then be carried out using the distinct software modules of the system, as described above, executing on the one or more hardware processors, such as those of smart phones (or other handheld electronic devices), servers, or the like. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, and the like (an exemplary and non-limiting list), and can also make use of, for example, Extensible Markup Language (XML), known application programs such as relational database applications, spreadsheets, and the like. The computers (or smart phones or other handheld electronic devices) can be programmed to implement at least portions of the logic depicted in the flow charts and other figures.

In at least some instances, messages may be in accordance with ISO standard 8583 (for example, authorization requests and authorization request responses). The ISO (International Organization for Standardization) 8583 standard for Financial transaction card originated messages—Interchange message specifications is known to the skilled artisan and is expressly incorporated herein by reference in its entirety for all purposes.

Also incorporated herein by reference in their entirety for all purposes are ISO/TEC 7810, ISO/IEC 7811, ISO/IEC 7812, ISO/IEC 7813, and ISO/TEC 4909.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   opening an application on a mobile phone to display one or more payment card options on the mobile phone;
   selecting payment card data from a database within the mobile phone including data relating to one or more payment cards, the selection of the payment card data causing the selected payment card data to be programmed onto a magnetic stripe located on a tab;
   moving the tab from a storage position on the mobile phone to a use position;
   swiping the tab through a magnetic card reader, causing the magnetic stripe to be read; and
   returning the tab to the storage position on the mobile phone, the returning causing a clearing of the payment card data programmed onto the magnetic stripe,
   wherein the step of clearing the payment card data programmed onto the magnetic stripe is caused by a combination of returning the tab to the storage position and one of an exit from the application on the mobile phone and determining a time out.

2. The method of claim 1, wherein the mobile phone includes a housing, wherein the step of moving the tab includes sliding the tab with respect to the housing.

3. The method of claim 1, wherein the mobile phone includes a housing, wherein the step of moving the tab includes pivoting the tab with respect to the housing.

4. The method of claim 1, wherein the mobile phone includes a housing and a removable case that contains the housing, the tab being secured to the removable case, wherein the step of moving the tab includes repositioning the tab with respect to the removable case.

5. The method of claim 1, further including an attachment device removably secured to the mobile phone, the tab being secured to the attachment, and further including the step of causing the tab to move from the storage position to the use position by pressing the attachment against the magnetic card reader.

6. The method of claim 1, further including downloading the application to an application memory, entering payment card data into the database and checking the validity of the entered card data.

7. The method of claim 6, wherein the step of entering payment card data comprises swiping a payment card through a magnetic card reader attached to the mobile phone.

8. A device comprising:
   a first housing portion comprising a receptacle for removable attachment to a mobile electronic device;
   a tab including a programmable magnetic stripe coupled, in a fixed position and orientation, to the first housing portion;
   a second housing portion, connected to the first hosing portion and resiliently disposed in a first position, and movable towards the first hosing portion and the mobile electronic device to a second position exposing at least a portion of the programmable magnetic stripe;
   a controller within the housing for programming the programmable magnetic stripe with payment card data; and
   a communication device configured to electrically communicate information from a mobile electronic device to the controller.

9. The device of claim 8, further including means for resiliently urging the second housing portion into the first position.

10. The device of claim 8, wherein the communication device comprises a USB connector.

11. The device of claim 10, wherein the connecting device comprises the USB connector.

12. The device of claim 8, wherein the communication device comprises an audio jack connector.

13. The device of claim 12, wherein the connecting device comprises the audio jack connector.

14. The device of claim 8, wherein the communication device comprises a dock connector.

15. The device of claim 14, wherein the connecting device comprises the dock connector.

16. A case comprising:
   a housing including an enclosure for containing a handheld electronic device and at least one opening for providing access to the enclosure;
   a tab comprising a knob exposed outside of the housing, the tab movably attached to the housing within a slot between a retracted position, wherein a programmable magnetic stripe portion of the tab is concealed, to an exposed position exposing the programmable magnetic stripe portion of the tab outside of the housing;
   a controller within the housing for programming the magnetic stripe with payment card data;
   a communication device on the housing configured to electrically communicate information from a mobile electronic device to the controller; and
   a magnetic stripe encoder disposed within the housing and along the slot, wherein a movement of the tab from the retracted position to the exposed position moves the tab including the programmable magnetic stripe portion along a slot and past the magnetic stripe encoder in a first direction and subsequently external to the housing by moving the tab including the programmable magnetic stripe portion along the slot in a second direction different than the first direction.

17. The case of claim 16, wherein the communication device comprises a USB connector.

18. The case of claim 16, wherein the communication device comprises an audio jack connector.

19. The case of claim 16, further including a hinge, the tab being secured to the hinge.

20. An assembly comprising:
   a mobile phone including a housing, an operating system, wallet application software operatively associated with the operating system, a display, an antenna, and a user interface operatively associated with the wallet application software, the wallet application software configured for entering payment card data, storing the payment card data in a database, checking validity of the payment card data, encrypting the payment card data, and transmitting the payment card data;

a tab including a programmable magnetic stripe; and a controller, receiving the payment card data from the wallet application software, the controller operatively associated with the tab and configured to program the programmable magnetic stripe with the payment card data, wherein the controller is further configured to clear the programmable magnetic stripe of the payment card data in response to detecting a combined condition including a retraction of the tab, an exit from the wallet application and a time-out driven by the controller.

21. The assembly of claim 20, further comprising:

a case including a plurality of panels defining an enclosure, an opening for providing access to the enclosure, the mobile phone being positionable in the enclosure such that the display is accessible through the opening, the tab being secured to the case and movable with respect to the case between a first position where the magnetic stripe is covered and a second position where the magnetic stripe is exposed, the controller being located within the case, and a connector device on the case for communicating the payment card data from the operating system to the controller.

22. The assembly of claim 21, wherein the tab is slidably mounted to the case.

23. The assembly of claim 20, further comprising an attachment device removably connectable to the phone housing, the tab being mounted to the attachment device, the controller being located within the attachment device, the attachment device including a connector device for communicating the payment card data from the operating system to the controller.

24. The assembly of claim 23, wherein the attachment device comprises first and second housing portions, the tab being attached to the first housing portion, the housing portions being movable with respect to each other between first and second positions, the magnetic stripe being stored within the housing when the housing portions are in the first position and exposed when the housing portions are in the second position.

25. A method comprising:

downloading a wallet application to a hand-held electronic device, said hand-held electronic device comprising a processor and a memory coupled to said processor, said memory having at least one non-wallet application stored therein;

opening said wallet application on said hand-held electronic device to display one or more payment card options on said hand-held electronic device;

selecting payment card data from a database within said hand-held electronic device including data relating to one or more payment cards;

causing the selected payment card data to be programmed onto a magnetic stripe located on a tab;

moving the tab from a storage position on said hand-held electronic device to a use position;

swiping the tab through a magnetic card reader, causing the magnetic stripe to be read; and returning the tab to the storage position on said hand-held electronic device, said returning causing a clearing of the payment card data programmed onto the magnetic stripe, wherein the step of clearing the payment card data programmed onto the magnetic stripe is cause by a combination of returning the tab to the storage position and one of an exit from the wallet application on the hand-held electronic device and determining a time out.

26. The method of claim 25, further comprising:

downloading said non-wallet application to said hand-held electronic device; and opening said non-wallet application on said hand-held electronic device.

27. The method of claim 26, wherein said non-wallet application that is downloaded comprises at least one of a music application, a map application, and a game application.

* * * * *